United States Patent [19]

Lederman et al.

[11] Patent Number: 4,995,489
[45] Date of Patent: Feb. 26, 1991

[54] ROLLER CLUTCH WITH SIMPLIFIED INSTALLATION

[75] Inventors: Frederick E. Lederman, Sandusky; Albert D. Johnston, Huron, both of Ohio

[73] Assignee: General Motors Corporation, Detroit, Mich.

[21] Appl. No.: 570,652

[22] Filed: Aug. 20, 1990

[51] Int. Cl.⁵ .................... F16D 41/07; F16D 15/00
[52] U.S. Cl. ................... 192/45; 192/41 R; 188/82.84
[58] Field of Search ............. 192/45, 44, 41 R, 41 A; 188/82.84

[56] References Cited

U.S. PATENT DOCUMENTS

| | | | |
|---|---|---|---|
| 4,711,330 | 12/1987 | Lederman | 192/45 |
| 4,712,661 | 12/1987 | Lederman et al. | 192/45 |
| 4,821,857 | 4/1989 | Groh | 192/45 |
| 4,850,462 | 7/1989 | Lederman | 192/45 |
| 4,850,463 | 7/1989 | Lederman | 192/45 |
| 4,893,702 | 1/1990 | Lederman | 192/45 |
| 4,921,084 | 5/1990 | Lederman | 192/45 |
| 4,924,980 | 5/1990 | Lederman | 192/45 |
| 4,924,981 | 5/1990 | Johnston et al. | 192/45 |

Primary Examiner—Rodney H. Bonck
Assistant Examiner—Andrea Pitts
Attorney, Agent, or Firm—Patrick M. Griffin

[57] ABSTRACT

A self seating roller clutch cage is molded with lead in ramps next to its cam hook engaging reacting faces, so that the cage need only be partially registered with the cam race before it is pushed in. Pushing the cage straight in alone acts to twist the cage to the point where the reaction faces and cam hooks are fully aligned.

2 Claims, 3 Drawing Sheets

1

ROLLER CLUTCH WITH SIMPLIFIED INSTALLATION

This invention relates to overrunning roller clutches in general, and specifically to such a clutch that registers automatically with the cam race when installed with only a straight axial push.

BACKGROUND OF THE INVENTION

Roller clutches that operate between a cam race and a pathway race must be installed between the races at some point, an operation that is often done manually. Installation is eased by the fact that the rollers and springs of the clutch are usually retained to a clutch cage as a secure subassembly that can be handled and installed as a unit. Still, situations may arise where roller clutches designed for conventional installation may be difficult to handle.

Conventional roller clutch installation typically involves the initial step of installing the clutch to the cam race alone. This allows the pathway race to be added last by the so called ringing in technique, in which it is simultaneously pushed and twisted into place, which serves to set the rollers and springs in a proper operating position. The clutch itself is also generally installed to the cam race with a push and twist technique, sometimes called the twist lock method. However, the pushing and twisting motions are not simultaneous, as when the pathway race is rung in. An example of a clutch cage designed for twist lock installation to a cam race is disclosed in U.S. Pat. No. 4,712,661 to Lederman et al. Clutch 10 has a cage 12 molded with smaller reaction ears 44A on the lead axial side, and larger reaction ears 44B on the trailing axial side. Each reaction ear 44A and 44B is also axially adjacent to a sloped reaction face that is shaped to abut with a similarly sloped cam hook 26C on the cam race 22. To install clutch 10, cage 12 is first turned relative to cam race 22 to a point where the lead side reaction ears 44A will fit past the peak of the cam hooks 26C. Next, cage 12 is pushed axially over cam race 22 until the reaction ears 44A and 44B are both axially aligned with the end faces of the cam race 22. Finally, cage 12 is twisted through a small angle until the reaction faces are abutted with the cam hooks 26C, completing the installation to the cam race 22.

The twist lock installation method works best when the installer can see the cam race well. The installer can then see when the cage has been moved to the point where the reaction ears will clear the cam race, allowing the cage to be pushed on. It is also important that the installer be able to maintain a grip on the cage throughout the process, so that the final twist that brings the reaction faces up against the cam hooks can be easily applied. There may be situations where both visual and physical access are limited. For example, the cam race may be surrounded by other structure that blocks a clear view. The clutch may have to be inserted into an area where it becomes difficult to do anything more than push the clutch cage straight in once it has been inserted beyond a certain point, and even the pushing force may have to be applied indirectly. Such blind assembly situations do not work well with a cage designed for twist lock installation.

SUMMARY OF THE INVENTION

The invention provides a roller clutch with a cage that can be installed to a cam race in blind assembly situations essentially by feel, with basically only a straight push. The cage need not be circumferentially aligned exactly with the cam race before it is pushed in, and it automatically registers its reaction faces with the cam hooks as it is installed.

The roller clutch of the invention operates between two conventional races, an inner pathway race, and an outer cam race. The cam race has an inner surface comprised of a plurality of evenly spaced, partially cylindrical bearing surfaces, each of which is adjacent to a cam hook that slopes up steeply in one circumferential direction to a peak. From the peak, which represents the greatest radius of the inner surface of the cam race, a shallower cam surfaces slopes down to the next adjacent bearing surface, creating an asymmetrical V profile with the cam hook.

The cage also includes a plurality of evenly spaced, planar reaction faces, each of which is shaped to conform closely to substantially the entire area of a respective cam hook. As such, the reaction faces are disposed at a radius greater than either the cam race bearing surfaces or the cam surfaces. Each of the reaction faces has a lead in ramp adjacent to it, and located on the lead axial side of the cage. The lead in ramps slope axially toward and merges into the plane of the reaction face, and is also sloped in the same circumferential direction as the reaction face. In addition, in the embodiment disclosed, the cage has a plurality of side rails in front of the lead in ramps. The side rails conform to the cam surfaces, but have enough clearance that they will fit past the cam surfaces if the cage is registered with the cam race closely enough that the lead in ramps are at least aligned with the cam hooks.

Given the shape, size and orientation of the lead in ramps and side rails relative to the inner surface of the cam race, the clutch may be installed in conditions of difficult access. The clutch cage is initially moved coaxially toward the cam race in a series of testing, probing motions. The cage will be blocked from moving fully over the cam race until the installer has aligned the lead in ramps with the the cam hooks. At that point, the side rails will fit under the cam surfaces, so the cage can be pushed in, sliding the lead in ramp along the cam hook. The cage twists itself until the reaction faces are aligned and registered with the cam hooks, after which it can be pushed straight in the rest of the way. The installation can be accomplished basically by feel, so long as it is possible to apply an axial push to the cage.

It is, therefore, a general object of the invention to provide a roller clutch that can be installed to a cam race in blind assembly situations.

It is another object of the invention to provide such a roller clutch with a cage that will automatically twist itself into proper registration with the cam race with only a straight axial push being applied.

It is another object of the invention to provide such a roller clutch cage with lead in ramps that merge into cam hook conforming reaction faces, so as to admit the cage over the cam race when the two have been partially aligned, and to complete the alignment of the reaction faces with the cam hooks as the cage is pushed home.

DESCRIPTION OF THE PREFERRED EMBODIMENT

These and other objects and features of the invention will appear from the following written description, and from the drawings, in which.

Figure 1:
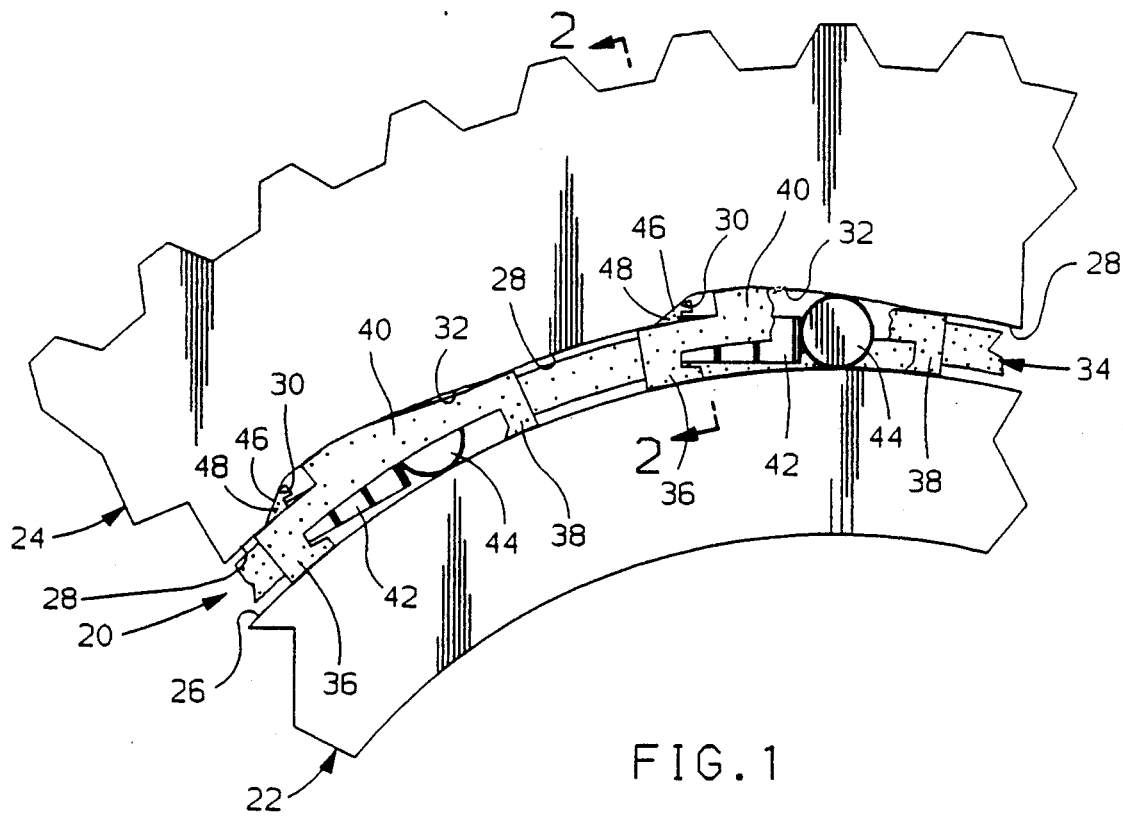
FIG. 1 is an axial view of a portion of a pair of clutch races and a preferred embodiment of the roller clutch of the invention partially broken away so as to better reveal the confronting inner surfaces of the races.
Figure 2:
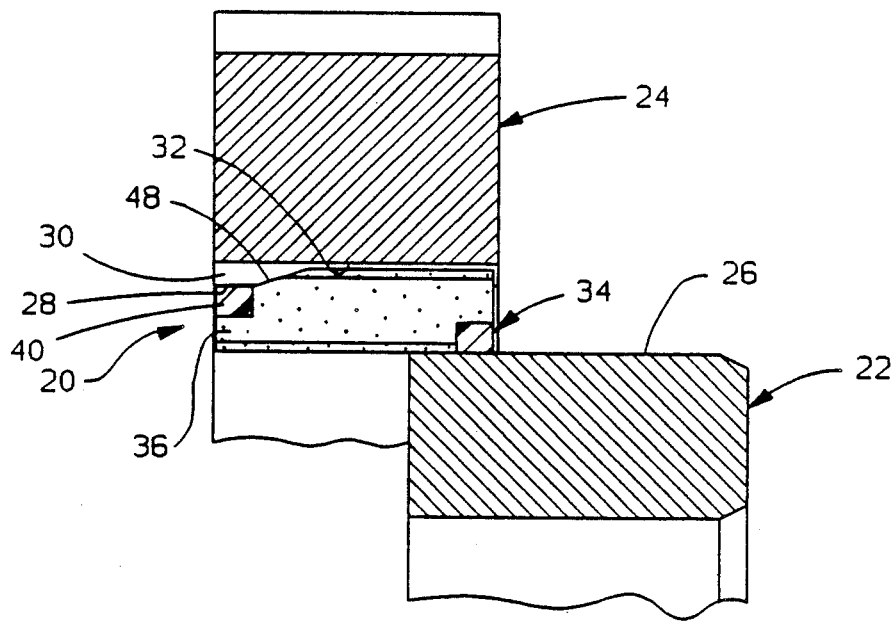
FIG. 2 is a sectional view taken generally along the line 2—2 of FIG. 1, with the roller removed, showing the clutch fully installed to the cam race, but showing the pathway race before it is installed.
Figure 3:
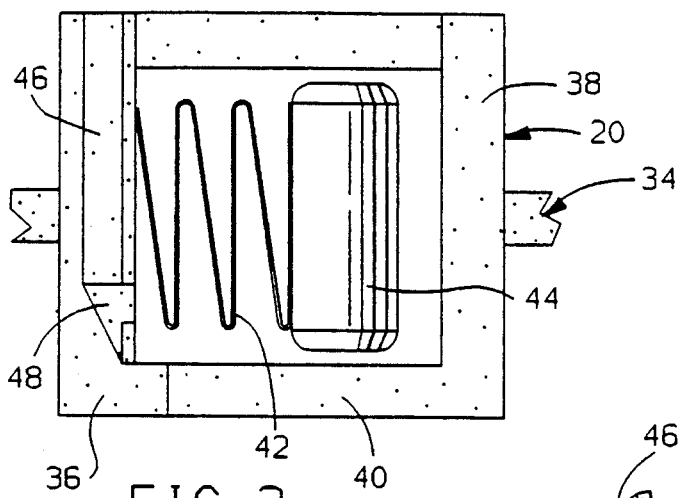
FIG. 3 is a view looking radialy into one pocket of the roller clutch after installation.

Referring first to FIGS. 1, 2 and 3, a preferred embodiment of a roller clutch made according to the invention, indicated generally at 20, operates between a pair of conventional clutch races, an inner pathway race indicated generally at 22, and an outer cam race indicated generally at 24. The inner surface of pathway race 22 is a smooth, cylindrical pathway 26. The inner surface of cam race 24 is more complex, consisting of an evenly spaced series of partially cylindrical bearing surfaces 28, separated by asymmetrically V shaped notches formed by short, steeply sloped cam hooks 30 and longer, shallow cam surfaces 32. The cam hooks 30 and cam surfaces 32 are both basically flat and planar, although the peak of the V where they meet is not sharp, but flattened out to an extent. All bearing surfaces 28 lie on the same radius, and therefore are concentric to pathway 26 when the races 22 and 24 are maintained coaxial to one another, as shown in FIG. 1. The peak of the V created by each cam hook 30-cam surface 32 pair represents the greatest radius of the inner surface of cam race 24, while the bearing surfaces 28 lie on the smallest radius. That relationship is used to advantage by the invention, as described below.

Figure 4:
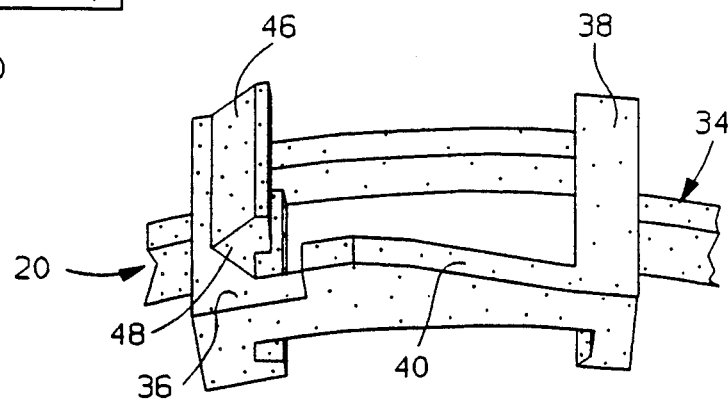
FIG. 4 is a perspective view of an empty pocket.
Figure 5:
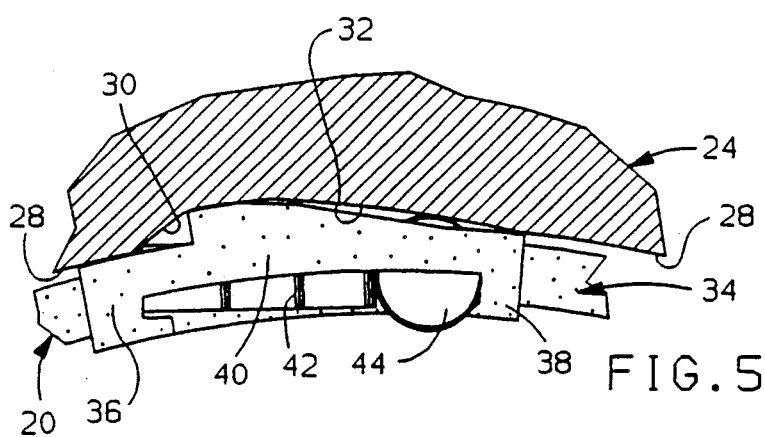
FIG. 5 is an axial view showing the clutch at the beginning of installation to the cam race.

Referring next to FIGS. 1, 4, and 5, clutch 20 includes a generally annular plastic molded cage, indicated generally at 34, which is sized to fit between the races 22 and 24. Cage 34 includes an evenly spaced plurality of journal blocks 36, one for each cam race bearing surface 28, arranged in a circular array about central axis. Each journal block 36 is generally arcuate, as viewed axially, and shaped so as to conform closely to a respective cam race bearing surface 28, as well as to the pathway 26. It is the journal blocks 36 that transfer and support radial loads between the races 22 and 24, and which keep them basically coaxial to one another. The journal blocks 36 do not fit absolutely tightly against either race 22 or 24, however. Therefore, if cage 34 is moved coaxially toward cam race 24, the journal blocks 36 can slide axially over the cam race bearing surfaces 28 without interference. Cage 34 also has an equal plurality of evenly spaced cross bars 38, one circumferentially spaced from each journal block 36. The cross bars 38 provide rest surfaces against which a plurality of conventional energizing springs 42 press a plurality of rollers 44 before pathway race 26 is installed, as shown in FIG. 5. Each roller 44 is thus maintained in a relatively secure shipping position, and clutch 20 can be installed as a subassembly. A plurality of upper side rails 40 is molded to the lead axial side of cage 34. The outer edge of each upper side rail 40 is generally in the shape of an asymmetrical, truncated V, presenting a profile that is close to the shape of a cam surface 32. However, there is some deliberate radial clearance between the outer edges of the upper side rails 40 and the cam surfaces 32, for a reason described below.

Referring next to FIGS. 1, 3 and 4, it may be seen that the post installation position of each roller 44 is significantly different. Each roller 44 is shifted counterclockwise away from its cross bar 38, in a ready position where it contacts the pathway 26 and a respective cam surface 32. Each spring 42 is compressed, and maintains its roller 44 in a ready position. In order for the spring 42 to act on its roller 44, it must push off of its respective journal block 36. Each journal block 36 must, therefore, be anchored relative to the cam race 24. The anchoring function is provided by a plurality of sloped reaction faces 46, one molded to each journal block 36, and spaced axially inboard of a respective upper side rail 40. Each reaction face 46 is also basically flat and planar, and slopes upwardly from the outer surface of a journal block 36 at the same angle as the cam hooks 30. Each reaction faces 46 is, therefore, shaped so as to conform closely to substantially the entire area of a respective cam hook 30. As such, the reaction faces 46 are disposed at the greatest radius of cage 34, as is the truncated peak of the upper side rail 40. The reaction faces 46, because of their close conforming shape, will not slide axially past the cam hooks 30 until they are rigorously aligned therewith. A lead in ramp 48 is molded axially adjacent to each reaction face 46, axially between it and its respective upper side rail 40. Each lead in ramp 48 slopes axially toward, and merges smoothly into, the plane of the reaction face 46 that it borders. Each lead in ramp 48 is also sloped circumferentially, in the same direction as the reaction faces 46.

Figure 6:
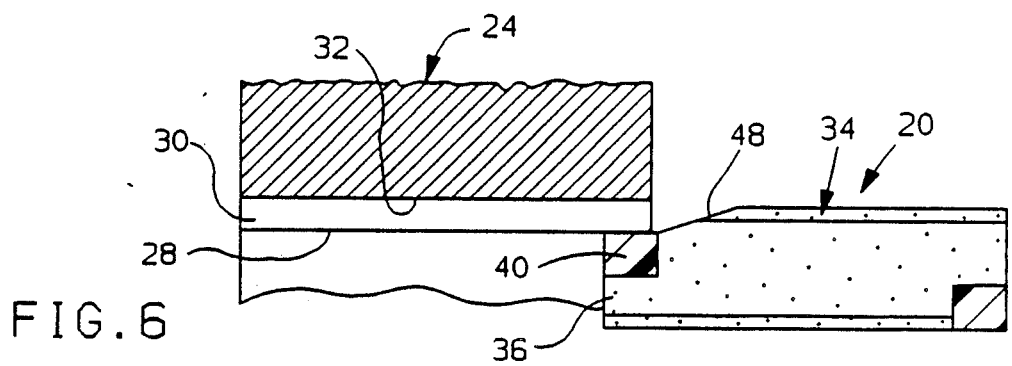
FIG. 6 is a radial cross sectional view corresponding to FIG. 5, with the roller removed.

Referring next to FIGS. 5 and 6, the initial installation step is illustrated. An installer would first hold cage 34 substantially coaxial relative to cam race 24, and push cage 34, lead side first, toward, and lightly into cam race 24. Feel alone should be sufficient to indicate to the installer whether the cage 34 is coaxial to the cam race 24. It would also be easy for an operator to tell, by the upper side rails 40, which was the lead side of cage 34. Furthermore, if the operator attempted to install cage 34 backwards, it would not fit, as the backward reaction faces 46 could never align with the cam hooks 30. Although the installer just insert the lead side of cage 34, it need not be held in any particular circumferential or angular orientation relative to cam race 24, at least to start. If, by coincidence, the cage 34 were in an orientation where the lead in ramps 48 were already aligned with the cam hooks 30, cage 34 could start to be pushed in immediately, as described more fully below. If not, then the only other possibilities are that the lead in ramps 46 would be aligned with a cam surface 32, or aligned with a bearing surface 28. In either case, the upper side rails 40 would block the cage 34 from being pushed in. Sensing blockage, the operator would turn the cage 34 in successive increments of a few degrees at a time, in one direction or the other, while continuing to push the cage 34 lightly in with each increment. Eventually, the the cage would reach an orientation where the lead in ramps 48 were aligned with the cam hooks 30.

Figure 7:
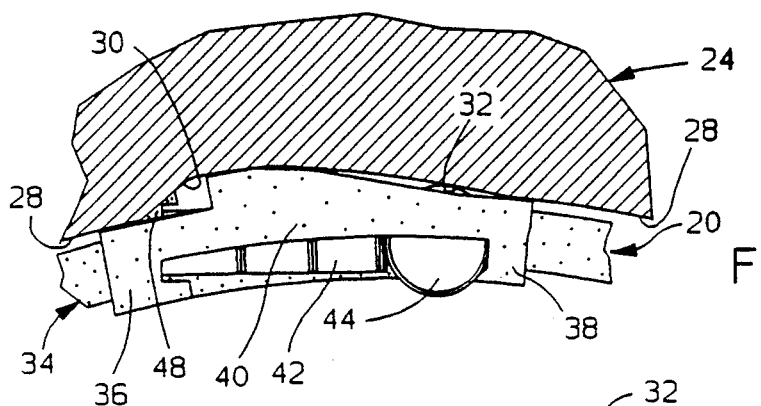
FIG. 7 is an axial view showing the clutch farther along in the process of installation, with the lead in ramp beginning to engage the cam hook.
Figure 8:
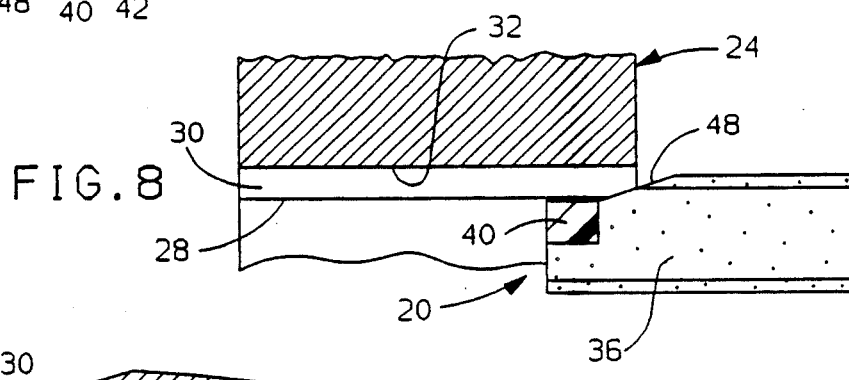
FIG. 8 is a radial cross sectional view corresponding to FIG. 7, with the roller removed.
Figure 9:
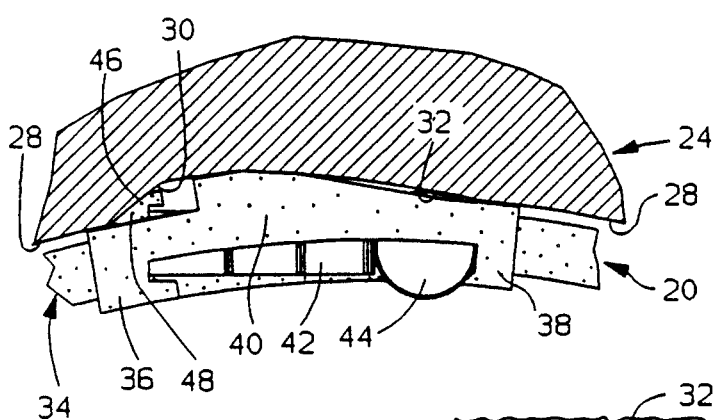
FIG. 9 is an axial view showing the clutch even farther along in the process of installation, with the lead in ramp past the cam hook, and the reaction face aligned with the cam hook.
Figure 10:
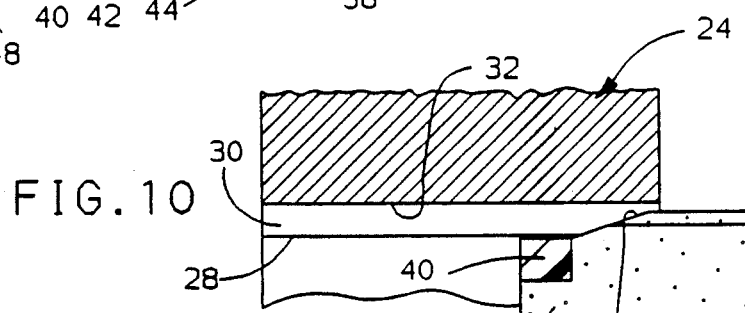
FIG. 10 is a radial cross sectional view corresponding to FIG. 9, with the roller removed.
Figure 11:
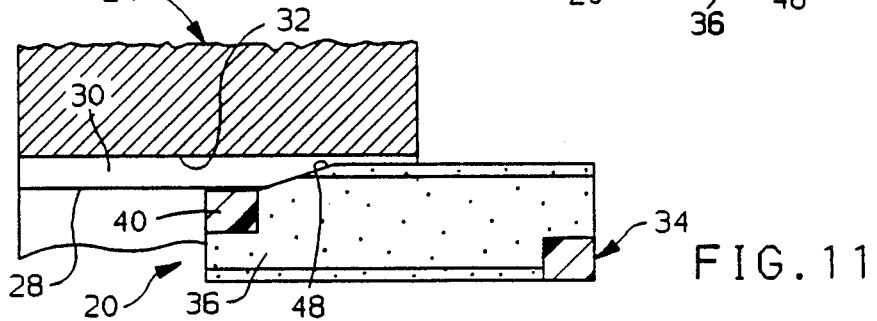
FIG. 11 is a view like 10, but showing the cage pushed farther onto the cam race, but not yet fully axially aligned with the cam race.

Referring next to FIGS. 7 through 11, once the lead in ramps 48 are aligned with the cam hooks 30, the cage 34 can begin to be pushed axially in, even though the cage 34 is not yet fully circumferentially aligned with cam race 24. This is because there is enough radial clearance between the upper side rails 40 and the cam surfaces 32 to allow the upper side rails to begin to move under the cam surfaces 32. As cage 34 is pushed in, the lead in ramps 48 eventually hit and begin to slide along the cam hooks 30, as shown in FIGS. 7 and 8. The lead in ramp 48 begins to be visible in FIG. 7. Because of the bi-directional slope of the lead in ramps 48, an automatic clockwise twisting is induced in the cage 34, even though only a straight axial push is being applied. Cage 34 is guided as it twists by the journal blocks 36 riding on the cam race bearing surfaces 28. Eventually, since the lead in ramps 48 terminate in the plane of the reaction faces 46, the cage 34 twists itself far enough that the reaction faces 46 do move into rigorous alignment with the cam hooks 30, as shown in FIGS. 9 and 10. At that point, the reaction faces 46 can slide axially past the cam hooks 30. Thus, it is assured that the reaction faces 46 and cam hooks 30 are properly registered.

Referring next to FIGS. 1 and 2, cage 34 is pushed axially in until clutch 20 is completely axially aligned with cam race 24. Completion could be sensed by the operator in terms of the trailing side of cage 34 moving flush with the near end face of cam race 24, as seen in FIG. 2. Or, an axial stop could be provided on the far end face of cam race 24 that cage 34 would bump into as it reached final position. This would serve both to indicate that cage 34 was axially aligned, and would also prevent cage 34 from moving in any farther. As a practical matter, some means would be provided to stop cage 34 from sliding axially off of cam race 24. No particular stop means is disclosed here, as it would operate independently of the invention disclosed. At any rate, it can be seen that cage 34 can be installed to cam race 24 essentially by feel, without the necessity of strictly registering cage 34 to cam race 24 first. So long as an axial push can be applied to cage 34, it will self seat. Thus, it is uniquely adapted to so called blind installation situations. Once clutch 20 is fully installed to cam race 24, inner pathway race 22 is moved coaxially inwardly, as shown in FIG. 2, toward the rollers 44. Pathway race 22 is simultaneously twisted by the installer as it is pushed in so as to shift the rollers 44 up the cam surfaces 32, compressing the springs 42. As the springs 42 attempt to expand, they serve both to keep the rollers 44 in ready position, and to keep the reaction faces 46 against the cam hooks 30. Clutch 20 is now operational.

Variations in the disclosed embodiment could be made. As to the lead in ramps 48, fewer than one for every roller 44 could conceivably provide enough twisting force to let the cage 34 self seat as it was pushed in. Theoretically, as few as one could serve, although there is no significant cost penalty in molding one to every journal block 36. The lead in ramps 48 need not merge directly into the reaction faces 46, there could be some axial space between them. So long as the lead in ramps 48 are on the lead axial side of cage 34, and so long as they are bi-directionaly sloped and terminate at the plane of the reaction faces 46, they will serve to twist cage 34 into the proper alignment as it is pushed in. Molding the lead in ramp 48 and reaction face 46 together creates a more solid part, however, and assures a smooth transition from twisting to just sliding as cage 34 is pushed in. Likewise, some cages may not have a solid, load bearing portion, like the journal blocks 36. Still, the journal blocks 36 provide an extra measure of guidance as cage 34 twists and slides into place, and molding the lead in ramp 48, reaction face 46, and journal block 36 integrally together creates an even more solid profile.

As far as the rest of cage 34, as few as one side rail on the lead side, shaped to conform substantially closely to a cam surface 32, could serve to block cage 34 from insertion until the lead in ramps 48 and cam hooks 30 were aligned. While the side rails 40 do cooperate in the installation of cage 34, they need not conform to the cam surfaces 32 in order for clutch 20 to operate properly after installation. Therefore, the cage side rails on the lead side of cage 34 could be made essentially straight or arcuate, with a radius comparable to the radius of the outer surface of the journal blocks 36. In that case, it would be possible for an operator to push cage 34 in, to some extent, if the lead in ramps 48 were registered with the cam surfaces 32, and not just aligned with the cam hooks 30, as disclosed. There would not be the blocking action of the disclosed upper side rails 40 to prevent it. Once the lead in ramps 48 were past the edge of the cam surfaces 32, however, the reaction faces 46, since they are disposed at the greater radius, would hit the cam surfaces 32. The installer would detect this by feel, and would know that another angular position of cage 34 would have to be attempted before cage 34 could be pushed all the way home. Therefore, it will be understood that it is not intended to limit the invention to just the embodiment disclosed.

The embodiments of the invention in which an exclusive property or privilege is claimed are defined as follows:

1. A roller clutch cage adapted for installation to a cam race having a plurality of evenly spaced cam hooks, each of which slopes in one circumferential direction, said cage comprising, a plurality of evenly spaced planar reaction faces, each sloping in the same direction as, and shaped to conform closely to, a respective cam hook, and, at least one lead in ramp axially adjacent to a respective reaction face and sloped axially toward, and in the same circumferential direction as, said reaction face, and terminating at the plane of said reaction face, whereby, said cage may be installed by moving it coaxially toward said cam race and indexing it progressively until said lead in ramp engages a cam hook, after which continued axial movement only of said cage acts to slide said cam lead in ramp along said cam hook, thereby twisting said cage in said one circumferential direction until said reaction faces register with said cam hooks.

2. A roller clutch cage adapted for installation to a cam race having a plurality of evenly spaced cam hooks, each of which slopes in one circumferential direction to an oppositely sloped cam ramp, said cage comprising, a plurality of evenly spaced planar reaction faces, each sloping in the same direction as, and shaped to conform closely to, a respective cam hook, at least one lead in ramp axially adjacent to a respective reaction face and sloped axially toward, and in the same circumferential direction as, said reaction face, and terminating at the plane of said reaction face, and, at least one side rail on the same side of said cage as, and in front of, said lead in ramp, and shaped so as to conform to a respective cam ramp sufficiently closely so as to fit axially past said cam ramp only when said said cage is circumferentially aligned with said cam race at least to the point where said lead in ramp and respective cam hook are aligned, whereby, said cage may be installed by moving it coaxially toward said cam race and indexing it progressively direction until said lead in ramp is aligned with a respective cam hook, after which said side rail may fit axially past a cam ramp as said cage is pushed in farther to allow said lead in ramp to engage and slide along said cam hook, thereby twisting said cage in said one circumferential direction until said reaction faces register with said cam hooks.

* * * * *